May 7, 1946.   O. W. BOUGHTON ET AL   2,399,909

OPTICAL INSTRUMENT

Filed Feb. 17, 1943

OLIN W. BOUGHTON
ROBERT B. HORSFALL JR.
WILLARD T. PERKINS
INVENTORS

ATTORNEYS

Patented May 7, 1946

2,399,909

UNITED STATES PATENT OFFICE 2,399,909

OPTICAL INSTRUMENT

Olin W. Boughton, Victor, Robert B. Horsfall, Jr., Perinton, and Willard T. Perkins, Irondequoit, N. Y., assignors to Bausch & Lomb Optical Company, Rochester, N. Y., a corporation of New York Application February 17, 1943, Serial No. 476,182

7 Claims. (Cl. 88—33)

This invention relates to optical instruments and more particularly to prismatic telescopes and like instruments.

In the now approved practice of mounting prisms, particularly Porro prisms such as are used in various prismatic telescopes and like instruments, the same are mounted on their hypotenuse face, generally being supported by a suitably apertured shelf or the like. Although various means have been proposed for holding the hypotenuse face of the prism in engagement with the one surface of the shelf, in most instances a strap has been used. It will be obvious that if the prisms are supported on the hypotenuse face, this face must be very accurately finished relative to the reflecting faces of the prism if the latter faces are to be located in the desired position relative to the other optical elements of the instrument. Otherwise, an error in the hypotenuse face will produce errors in position of the reflecting faces.

Thus the reflecting faces of the prisms are indirectly located and held and it is an object of the present invention to provide direct mechanical means for locating and holding the reflecting faces of the prism, and to this end the prisms of the instrument of the present invention are mounted directly on the reflecting faces thereof. Although any mounting means desired could be used, in the preferred form of the present invention the mounting means comprise casings provided on their interior surfaces with small pads engaging the reflecting faces of the prism and locating the planes of the same. The pads are so located that although they contact the reflecting faces of the prism, they do not interfere with the optical performance of the faces, but yet provide adequate support for the prisms.

As three pads, accurately spaced, will determine the plane of one of the reflecting faces of the prism, the other faces of the prism can be determined by two pads engaging one of the other faces since the angle between the two engaged faces is fixed. Any conventional means acting against the hypotenuse face can be used to force the reflecting faces against the mounting pads of the casing. As the pads will correctly locate the reflecting faces in the predetermined desired planes even though there is some pyramidal error in the faces, prisms which heretofore have been rejected for quality instruments can be used when mounted in accordance with the present invention. This eliminates one of the factors which heretofore has contributed to the high cost of manufacture of quality instruments.

In many instruments such as binoculars, the prisms have been secured on seats formed on a shelf which was generally mounted on suitable bosses or the like formed on the interior surface of the body member. The prism receiving seats of the shelf not only had to be accurately formed, but considerable skill was required of the workmen to accurately place the prisms on the shelf and to mount the latter within the body member. In the instrument of the present invention, the shelf has been eliminated for the casings are secured together and mounting lugs carried by one of the casings are used to mount the casings within the body member after the same have been secured together. The engaging surfaces of the lugs of the casings are formed uniplanar so that they will hold the prism casings in the desired relative position after they have been assembled. The mounting lugs are secured to seats formed on the interior surface of the body member and as the surface of the seats and the surface of the lugs are accurately faced, the casings can be fixed within the body member and will hold the prisms in the desired position relative to the optical axis of the other optical elements of the instrument.

As the prisms can be assembled with the casings and the assembled casing mounted within the body member by relatively unskilled labor, a substantial saving is effected in the manufacturing costs of instruments such as disclosed by the present invention. Furthermore, as the prisms are rigidly mounted within the body member, there is considerably less danger of the same accidentally moving out of proper alignment than prisms mounted by previously proposed methods.

Other objects and advantages of the present invention will appear from the following description taken in connection with the accompanying drawing in which.

The device of the present invention, for the purpose of illustration, has been shown as a prismatic binocular and for convenience of illustration only one unit of the binocular has been illustrated.

The instrument comprises the usual body member 10 which may be integrally cast. The one end of the body is closed by an objective assembly 11 mounted within the end of the body member by means of an eccentric ring such as disclosed in the U. S. Patent No. 959,739 and which permits the objective to be rotated to adjust the optical axis of the same.

Figure 1:
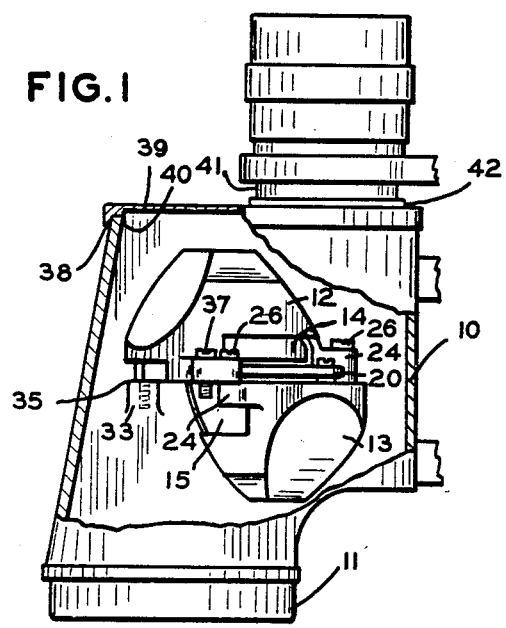
Fig. 1 is an elevational view partly in section of one unit of a prism binocular embodying the improvements of the present invention.
Figure 2:
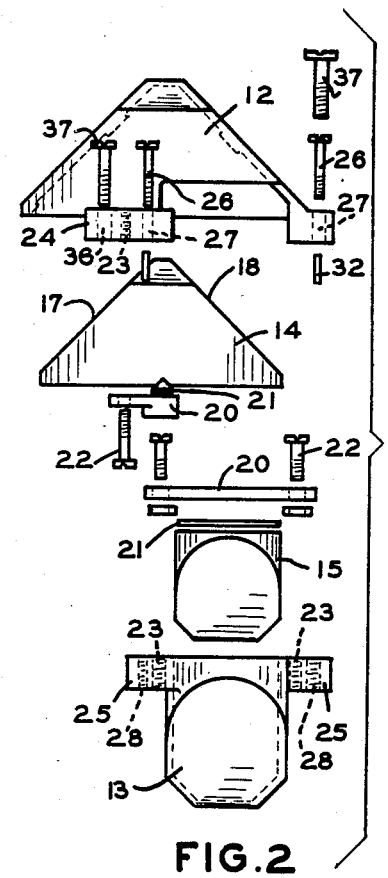
Fig. 2 is an exploded view of the prism assembly of the present invention.
Figure 3:
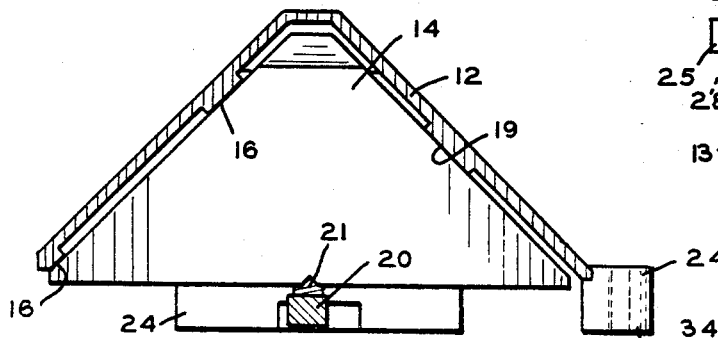
Fig. 3 is an enlarged longitudinal sectional view of one of the casings for mounting a prism and the prism mounted therein.
Figure 4:
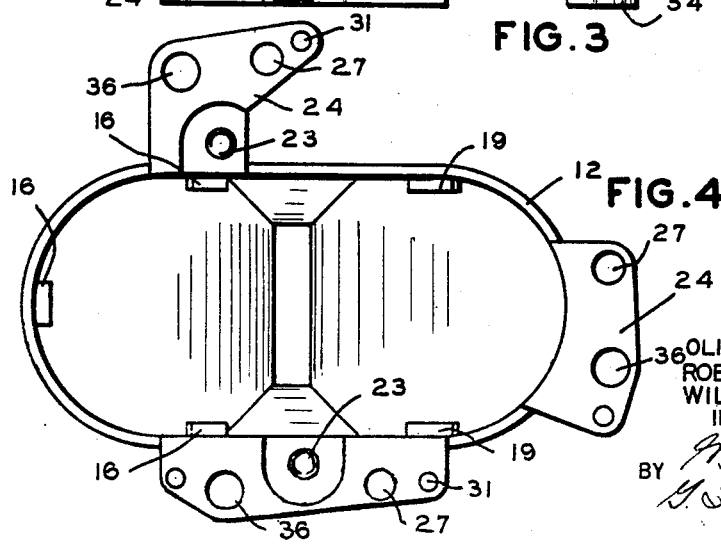
Fig. 4 is a plan view showing the inside of the casing of Fig. 3.

The means for mounting the two Porro prisms, referring now to Fig. 2, comprises casings 12 and 13 housing the prisms 14 and 15, respectively. Each casing is substantially the same size and shape as the prism which is to be housed therein and the one interior wall of each of the casings 12 and 13 is formed with three substantially equally spaced pads 16, the surfaces of which are accurately machined so that the same are coplanar.

It will be readily understood that the surfaces of the pads 16 will determine the plane of the reflecting face 17 of the prism when the face is urged against the surfaces. As the angle between the reflecting face 17 and the face 18 is accurately held to 90°, the face 18 can be located by means of only two points and consequently the opposite inner wall of each casing is formed with two pads 19, the coplanar surfaces of which engage the face 18 of the prism mounted within the casing. The pads 16 and 19 are so spaced that they do not interfere with the optical performance of the reflecting surfaces but yet form a rigid support for the same.

Although any means desired may be used for holding each prism within its casing, in the preferred form of the present invention, this means comprises a strap 20. A cushioning strip 21 of some resilient material is placed between the strap 20 and the hypotenuse face of each prism before the strap is drawn tight against this face by means of the screws 22 threaded into tapped openings 23 formed in lugs 24 and 25 made integral with the casings 12 and 13, respectively.

With the prisms tightly held in the casing, the casings are secured together by screws 26 passed through openings 27 formed in the lugs 24, and threaded into tapped openings 28 formed in the lugs 25. The openings 27 are slightly larger in diameter than the openings 28 so that the casings may be shifted relative to each other to square the prisms 14 and 15 after these casings are secured together by the screws 26. After the prisms are squared, the screws 26 are tightened and openings, not shown, are spotted in the lugs 25 by means of preformed openings 31 formed in the lugs 24 of the casing 12. The casings are separated after the openings in the lugs 25 are formed and dowel pins 32 are fitted into the openings 31 after which the casings are again brought together to mount the one end of the pins 32 within the spotted openings of the lugs 25. As these openings were located by means of the openings 31, the casings are now properly mounted relative to each other and the prisms are square. The screws 26 are now tightened and the casing will be held against accidental relative movement by reason of the screws 26 and the pins 32.

It will be seen that the prisms are rigidly held by the particular mounting means of the present invention and there is very little likelihood of the prisms shifting or moving out of alignment after their assembly with the casing. This eliminates one of the defects of the previously proposed instruments wherein the prisms were mounted on their hypotenuse faces on the shelf.

With the prisms held in the thus assembled casings, the latter are mounted within the body 10 by means of the lug 24 of the casing 12 and bosses 33 formed integral with the interior wall of body 10. In the preferred form of the present invention, the lugs 24 of the casing 12 have the underneath surface 34 thereof accurately ground uniplanar and these surfaces are used to mount the assembled prism casings on coplanar seats 35 formed on the bosses 33. The lugs 24 of the casing 12 are formed with holes 36 for taking screws 37 which hold the lugs 24 on the seats 35 of the bosses 33, the lugs 24 being located by the practice now used to locate the prism shelf within the body. The seats 35 of the bosses 33 and the machined surfaces 34 of the lugs 24 are so formed that when the assembled casings are mounted within the body, the optical axis of the prisms will be in the desired position relative to the optical axis of the other elements of the instrument. The seats 35 are formed parallel with the end surface 38 of the body 10 at the end closed by a closing cap 39, for this end surface is used as a reference plane for mounting the other optical elements of the instrument. The cap 39 is formed on its underside with a uniplanar surface 40 which is brought into engagement with the end surface 38 when the cap 39 is mounted to the body 10 by means of conventional mounting screws.

The ocular system of the instrument is carried by the usual mounting tube 41 which may be mounted to the body member by passing the one end thereof through an opening formed in the cap 39 and threading the end of the tube projecting through the opening into a suitably threaded socket member formed integral with the body 10. The mounting tube 41 in the form of the invention thus stated is formed with a stop collar 42 which limits the movement of the tube 41 as the same is threaded into the body 10 and determines the position of the tube relative to the surface 40 of the closing cap 39.

In the assembly of the instrument of the present invention, it is not necessary to pair the prisms as in the assembly of previous instruments, for the pads will correctly locate the reflecting faces in the predetermined desired planes even though there is some pyramidal error in the reflecting faces. Thus, prisms which heretofore have been rejected can be used even in quality instruments when mounted in accordance with the present invention. This reduces to a considerable extent the number of prisms heretofore rejected and consequently a considerable saving in the cost of high quality instruments is thereby effected.

A further saving is effected in the assembly of the instrument of the present invention, for relatively unskilled labor can be used to mount the prisms within the casings, for this assembly operation consists merely of dropping the prisms into the casings and tightening the holding straps against the hypotenuse faces of the same to hold the respective faces in engagement with the mounting pads of the casings.

It will be obvious that the casings can be secured together after the prisms have been squared and the secured together casings mounted within the body 10 by workmen of less skill than heretofore have been employed to mount the prisms to the seats of the shelf and secure the shelf within the body member of the instrument.

While one embodiment of the invention has been disclosed, it is to be understood that the invention need not be limited to the device described but is susceptible of modification falling within the sphere of the invention and the scope of the appended claims.

We claim:

1. In an instrument of the type described, a pair of prisms, each prism having at least two reflecting faces; a casing for housing each prism; a plurality of mounting pads carried by the interior surfaces of two walls of each casing, the pads carried by one wall of each casing having coplanar surfaces and being of a number sufficient to locate one reflecting face of the prism housed thereby, the pads of the other wall of each casing having coplanar surfaces and being of a number sufficient to locate the other of said reflecting faces and less than the number of pads of the first-named wall; and means for holding said prisms with their reflecting faces engaging said mounting pads.

2. In an instrument of the type described, a pair of prisms, each prism having at least two reflecting faces; a casing for housing each prism; a plurality of mounting pads carried by the interior surfaces of two walls of each casing, the pads carried by one wall of each casing having coplanar surfaces and being of a number sufficient to locate one reflecting face of the prism housed thereby, the pads of the other wall of each casing having coplanar surfaces and being of a number sufficient to locate the other of said reflecting faces and less than the number of pads of the first-named wall; means for holding said prisms with their reflecting faces engaging said mounting pads; and means for securing the casings together whereby the reflecting faces of one of said prisms are held in predetermined positions relative to the reflecting faces of the other of said prisms.

3. In an instrument of the type described, a pair of prisms; a casing for receiving each prism; means for holding each prism in its casing; surfaces formed internally of each casing for engaging the reflecting faces of the prism mounted therein for locating said faces in predetermined planes; means for securing said casings together whereby the reflecting faces of one of said prisms are held in predetermined positions relative to the faces of the other prism; a body member; and means for securing one of said casings within said body member with the reflecting faces of the prism of said secured prism in predetermined positions relative to said body member.

4. In an instrument of the type described, a pair of prisms, each prism having a plurality of reflecting faces; a casing for receiving each prism; means for holding each prism in a casing; surfaces formed internally of each casing for engaging the reflecting faces of the prisms mounted therein for locating said faces in predetermined planes; a plurality of lugs carried by each casing; means for securing the lugs of one casing to the lugs of the other casing; and means for holding the secured together casings in predetermined relative positions.

5. In an instrument of the type described, a pair of prisms, each prism having a plurality of reflecting faces; a casing for receiving each prism; means for holding each prism in a casing; surfaces formed internally of each casing for engaging the reflecting faces of the prisms mounted therein for locating said faces in predetermined planes; a plurality of lugs carried by each casing; means for securing the lugs of one casing to the lugs of the other casing; means for holding the secured together casings in predetermined relative positions; a body member; a plurality of seats formed on the interior wall of said body member; and means for securing at least some of the lugs of one of said casings to the seats of the body member.

6. In an instrument of the type described, a pair of prisms, each prism having a plurality of reflecting faces; a casing for receiving each prism; means for holding each prism in a casing; surfaces formed internally of each casing for engaging the reflecting faces of the prisms mounted therein for locating said faces in predetermined planes; a plurality of lugs carried by each casing; means for securing the lugs of one casing to the lugs of the other casing; means for holding the secured together casings in predetermined relative positions; a body member; a plurality of seats formed on the interior wall of said body member; and means for securing at least some of the lugs of one of said casings to the seats of the body member, said means including means for locating said last-named casing in a position within said body member wherein the reflecting faces of the prism contained therein will be located in predetermined positions relative to said body member.

7. In an instrument of the type described the combination of a Porro prism having two reflecting faces and a hypotenuse face, means for holding said prism, said means comprising a member extending along and adjacent to said reflecting faces, three spaced pads rigidly carried by said member, said pads having substantially co-planar surfaces which determine a fixed plane, one of said reflecting faces being in contact with said pads, said member having two additional pads having substantially co-planar surfaces lying in another plane, the other reflecting face being in contact with said additional pads, and strap means carried by said member and engaging said hypotenuse face for detachably holding the prism with the reflecting faces against the pads.

OLIN W. BOUGHTON.
ROBERT B. HORSFALL, Jr.
WILLARD T. PERKINS.